May 7, 1968 A. JENSEN 3,382,418

SEMICONDUCTOR SWITCHING ELEMENT WITH HEAT-RESPONSIVE CENTRAL CURRENT PATH

Filed Nov. 18, 1965

United States Patent Office 3,382,418

Patented May 7, 1968

3,382,418

SEMICONDUCTOR SWITCHING ELEMENT WITH HEAT-RESPONSIVE CENTRAL CURRENT PATH

Arne Jensen, Havnbjerg, Als, Denmark, assignor to Danfoss A/S, Nordborg, Denmark, a company of Denmark

Filed Nov. 18, 1965, Ser. No. 508,437
Claims priority, application Germany, Nov. 18, 1964, D 45,871
7 Claims. (Cl. 317—237)

ABSTRACT OF THE DISCLOSURE

A switching element having a thermally-conductive solid state semiconductor body sandwiched between a pair of electrically and thermally conductive electrodes. The semiconductor has a negative temperature coefficient of electrical conductivity and the electrodes have a coefficient of thermal conductivity less than the coefficient of thermal conductivity of the semiconductor body so that in operation a centrally located current path obtains and the path retains and is responsive to heat resulting from current flow therein. The relatively poor heat conductivity of the electrodes and the coverage of all the side area of the semiconductor by the electrodes results in a position of the current path centrally and the cross-sectional enlargement of the path due to radial heat migration allows current flow increases.

Figure 1:
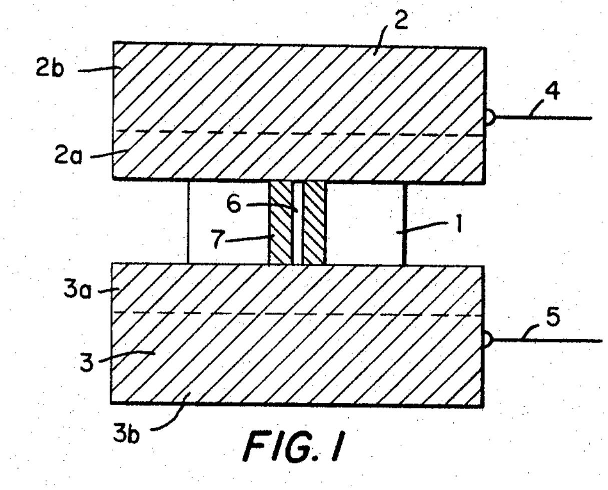

The present invention relates to solid state semiconductor switching elements and more particularly to such elements which consist of a body of semi-conductor material having a negative temperature coefficient of resistance.

Solid state semi-conductor switching elements containing essentially 67.5% tellurium, 25% arsenic, and 7.5% germanium, are known. Broadly, such elements consist essentially of tellurium with additions from elements of Groups IV and V of the Periodic Table of elements. They can be prepared by evaporation on a metal layer, by sintering, or by permitting a melt to solidify. In the high-resistance state, such elements have a resistance of several megohms; in the low-resistance state, the resistance may be in the order of one ohm.

It is believed that, in the high-resistance state, the very small current which passes through the element is essentially evenly distributed over the region of the element covered by the electrodes. If, however, for some reason the temperature of the element changes at any particular location therein, and the particular location may be entirely at random, then due to the negative temperature coefficient of resistance, the current density will increase at that particular location; this, of course, leads immediately to a larger current through that region and very quickly a path of increased temperature and substantial electrical conductivity is obtained. In the low resistance state the current, therefore, essentially passes through this path. The switchover effect is usually obtained by increasing the potential beyond a certain threshold value; other external stimuli may, however, also be used, such as an increase in temperature or pressure on the solid state switching element.

It is desirable that the region of conductivity when the element is in its low resistance state does not occur at a random position within the element, but rather at predetermined regions of conductivity, preferably substantially in the center of the semi-conductor body. It is also desirable, in many cases, to prevent excessive temperature rise. Rather than increasing the current carrying capacity by increasing the temperature of the current path, which will lead to a still higher temperature and possibly to damage to the element, the cross sectional area of the conductive current path should be increased.

Briefly, in accordance with the present invention, a substantially centrally located current path can be obtained by carefully matching the material of the electrodes to that of the semi-conductor element itself with respect to the thermal conductivity of the electrode and semi-conductor material, and preferably such that the thermal conductivity of the electrode material is in the order of magnitude of that of the semi-conductor material or less.

The thermal conductivity of the material has previously not been considered to be of importance. Thus, choice of the electrode material itself was governed by considerations of expansion, ease of connection or the like rather that with any regard to the current distribution within the element.

Figure 2:
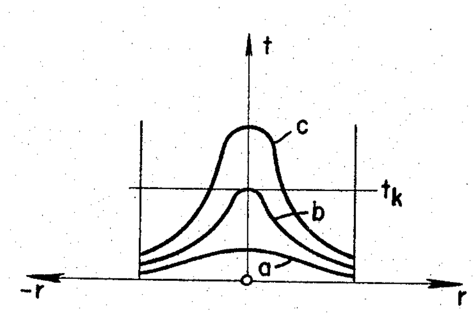

The structure, organization and operation of the invention will not be described more specifically in the following detailed description with reference to the accompanying drawings, in which:

FIG. 1 is a schematic cross-sectional view through a semi-conductor element in accordance with the present invention, and FIG. 2 is a diagram illustrating temperature distribution within the cross-section of the semi-conductor element.

Referring now to the drawings:

FIG. 1 is a cylindrical semi-conductor body 1, arranged in known manner between two similar electrodes 2 and 3, each having lead wires 4 and 5 soldered thereto. When a small potential is placed on the electrodes, a current with a very small and rather uniform distribution flows through the body of the semi-conductor element 1, causing a very small heating. This heat is dissipated at the outer sides of the assembly, such that a radial heat flow is predominant. In accordance with the invention, the heat conductivity of the electrodes is matched to that of the heat conductivity of the semi-conductor body, so that axial heat flow is a less preferred path, than the heat flow in radial direction, as would be the case if the electrodes would consist of a good-heat conductive material. Since the heat within the center of the element cannot be dissipated as quickly as on the outside, a temperature distribution essentially along that of curve *a* FIG. 2 (in which the ordinate shows temperature, and the abscissa radius of the circular element with respect to its center) will arise.

When the potential across electrodes 2, 3 is increased, the current through the semi-conductor body will likewise increase. Since the radial heat flow will cause the highest temperature to occur in the center of the element, a current path 6, FIG. 1 will form when a certain critical value $t_k$ (curve *b*) which corresponds to a certain threshold potential, is exceeded.

Since practically the entire current would be carried by the path having the cross section 6, FIG. 1, this particular path will heat up substantially. This increases the stability of the paths within the element. When, however, the applied potential increases even further, and the temperature of the path increases, then, due to the radial heat migration, regions adjacent path 6 will likewise increase their temperature and accept a portion of the increased current, as shown in curve *c* of FIG. 2. In this case, the path will have a cross section which corresponds approximately to the cross hatched region 7 in FIG. 1.

Thus, due to the relatively poor heat conductivity of the electrodes, the position of the path of current within the center of the semi-conductor element, as well as the enlargement of the cross sectional region thereof is insured.

Preferably, the electrodes cover the semi-conductor on both sides entirely and extend beyond the semi-conductor as shown in FIG. 1. This insures that the entire axial surface of the semi-conductor body is covered with a material having equal, or poorer thermal conductivity, and none of the semi-conductor body is in contact with the air permitting heat dissipation and causing thermal migration within the semi-conductor element axially thereof.

It is not necessary to manufacture the electrodes of a material having lesser thermal conductivity than that of the semi-conductor material. It is possible to make the electrode in a plurality of layers, for example two layers, provided that the layer adjacent to the semi-conductor body has a thermal conductivity matched to that of the semi-conductor body itself. Such a layer is frequently sufficient to provide for essentially radial heat dissipation within the semi-conductor body. The division of electrodes into two layers, 2*a*, 2*b* and 3*a*, 3*b* respectively is schematically indicated by the dashed lines in FIG. 1.

Various metals may be used for the electrodes, so long as it is of poor heat conductivity. For example, nickel, nickel-iron alloys, and the like have a thermal conductivity of about 0.1 cal./second cm. ° C. Another very useful material for the electrodes is carbon. Since carbon occurs in various forms, having different thermal conductivity, it is important to select a form which has very low heat conductivity; for example, amorphous carbon has a heat conductivity of 0.01 cal./sec. cm. ° C., whereas graphite has a comparatively good heat conductivity, in the order of .3 cal./sec. cm. ° C. The heat conductivity of the semi-conductor material itelf depends upon its specific manner of manufacture—whether it has been sintered, whether it is glazed, mono-crystalline, poly-crystalline, etc. as well as on the specific composition. Besides the initially mentioned composition of tellurium with additives taken from Groups IV and V of the Periodic Table of elements, other combinations are possible. Experiments on a few samples have shown that the semi-conductor material as specifically mentioned has a thermal conductivity of about 0.01 cal./sec. cm. ° C, or slightly in excess thereof.

What is claimed is:

1. A switching element comprising a solid state semiconductor body having a negative temperature coefficient of electrical conductivity, said body being thermally conductive and sandwiched between a pair of electrically conductive electrodes, said electrodes having a coefficient of thermal conductivity less than the coefficient of thermal conductivity of said semiconductor body and connected to said body at the repective ends of a centrally located current path therethrough, whereby the current path retains and is responsive to heat resulting from current flowing therein.

2. Switching element as claimed in claim 1, in which said electrodes cover entirely opposite sides of said negative temperature coefficient semiconductor body.

3. Switching element as claimed in claim 2, in which said electrodes extend beyond said body of negative temperature coefficient.

4. Switching element as claimed in claim 1, in which said electrodes each comprise a plurality of layers, the layer adjacent said semiconductor body being of a material of thermal conductivity matched to said semiconductor body of negative temperature coefficient.

5. Switching element as claimed in claim 1, in which said electrodes comprise nickel.

6. Switching element as claimed in claim 1, in which said electrodes comprise carbon having a thermal conductivity matched to the thermal conductivity of the negative temperature coefficient semiconductor body.

7. Switching element as claimed in claim 1, in which said electrodes comprise nickel-iron alloy.

References Cited

UNITED STATES PATENTS

| | | | |
|---|---|---|---|
| 2,938,130 | 5/1960 | Noll | 307—88.5 |
| 3,300,710 | 1/1967 | Knauss | 323—17 |

JAMES D. KALLAM, *Primary Examiner.*

JOHN W. HUCKERT, *Assistant Examiner.*